United States Patent
Liu et al.

(10) Patent No.: US 8,117,402 B2
(45) Date of Patent: Feb. 14, 2012

(54) DECREASING SHARED MEMORY DATA CORRUPTION

(75) Inventors: Xin Hua Liu, Beijing (CN); Roger Michael Meli, Raleigh, NC (US); Xiao Song Ran, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 12/104,887

(22) Filed: Apr. 17, 2008

(65) Prior Publication Data

US 2008/0270722 A1 Oct. 30, 2008

(30) Foreign Application Priority Data

Apr. 29, 2007 (CN) .......................... 2007 1 0107758

(51) Int. Cl.
*G06F 12/00* (2006.01)

(52) U.S. Cl. ..................................................... 711/147

(58) Field of Classification Search .................. None
See application file for complete search history.

(56) References Cited

U.S. PATENT DOCUMENTS

| 5,875,339 | A | * | 2/1999 | Molnar et al. ................ 710/240 |
| 7,100,161 | B2 | | 8/2006 | Latour |
| 2006/0242540 | A1 | | 10/2006 | Cherian et al. |

OTHER PUBLICATIONS

"Fast IPC Communication Using Shared Memory and InterlockedCompareExchange (updated!)", The Code Project, http://www.codeproject.com/KB/threads/fast_ipc.aspx, Sep. 28, 2006, 12 pages.

"Mutex Objects", Microsoft Developer Network (msdn), Microsoft Corporation, http://msdn.microsoft.com/en-us/library/ms684266, accessed on Aug. 11, 2011, 2 pages.

"Understanding the consequences of Wait_Abandoned—The Old New Thing", Microsoft Corporation, http://blogs.msdn.com/b/oldnewthing/archive/2005/09/12/463977.aspx, Sep. 12, 2005, 8 pages.

* cited by examiner

*Primary Examiner* — Brian Peugh (74) *Attorney, Agent, or Firm* — Stephen J. Walder, Jr.; Jeffrey S. LaBaw (57) ABSTRACT

The shared memory includes a header section and a data section, wherein said header section includes at least two headers in which control information is stored. The method comprises the steps of: judging whether or not there is data corruption in one of said at least two headers; and copying the control information in any one of other headers to said one header if there is data corruption in said one header. A method for controlling access to a shared memory is also disclosed.

18 Claims, 6 Drawing Sheets

DECREASING SHARED MEMORY DATA CORRUPTION

CROSS REFERENCE TO RELATED APPLICATIONS

This application claims priority of China Patent Application No. 20071.0107758.5 entitled "Method and Apparatus for Decreasing-Shared Memory Data Corruption" filed on Apr. 29, 2007, which is incorporated herein by reference and assigned to the assignee herein.

FIELD

This written description relates to the field of a shared memory, and more particularly, to a method and apparatus for decreasing data corruption in a shared memory and a method for controlling access to a shared memory.

BACKGROUND

It is well known that a shared memory is a memory area shared by two or more processes (or threads) in a multi-task environment and usually used for supporting high-speed data transmission. Typically, each process using the shared memory conforms to a set of rules that prohibits two or more processes from simultaneously accessing (writing or reading) the same memory area.

Specifically, a mutex can be utilized to prevent two or more processes from simultaneously accessing the shared memory. As is well known to those, skilled in the art, a mutex is an inter-process synchronization mechanism, wherein a process owning the mutex enjoys exclusive access to the shared memory, and only after the mutex is released, can other process perform exclusive access to the shared memory.

In the prior art, a shared memory typically contains a header section and a data section, where the header section holds critical control data such as semaphores, size of memory block, pointers to available locations etc.; and the data section is an area where a process performs a data operation, such as reading/writing data, during accessing the shared memory. In general, a process owning a mutex performs data operations within the data, section based on the control data in the header section. Hence, the control data in the header section is critical to the correct operations, of systems using this shared memory. If data in the header section is corrupt, the systems using the shared memory area will probably stop functioning. "Data corruption" usually means control data blocks in the header section of a shared memory are damaged or lost or inconsistent with a data status of the data section. That is, the control data in the header section cannot correctly reflect the data status in the data section.

If data corruption takes place in the header section of a shared memory, remedial steps are taken by providing supporting scripts that solve the problem (delete and re-create the shared memory), or by restarting all applications using the shared memory, or by rebooting the machine. However, in either case, the applications are subject to down time. A shared memory is usually used for inter-process communication as a high-speed mechanism, and thus: any down time is very undesirable and unacceptable.

As described above, when a plurality of threads or processes intend to use a shared memory, a mutex is usually utilized to control exclusive access to the shared memory segments, including the header section. That is to say, only a thread or process owning the mutex is entitled to perform operations with the shared memory area. A typical procedure to exclusively access the shared memory by a process or thread includes the steps of:

(1) locking the mutex to get an exclusive access to the shared memory, wherein after locking, only the current process or thread can access the shared memory, while the other processes or threads keep waiting until the mutex is released;

(2) reading the control data in the "header section" of the shared memory, in order to know how many bytes are available for writing (or reading), and where to write (or read) etc.;

(3) if the shared memory is available for writing (or reading), then starting data operation within the "data section" of the shared memory;

(4) after data operation, updating the "header section" using a new status of the "data section," i.e. writing (or reading) a new location, a new available space to write (or read), etc.; and, (5) after steps (3) through step (4) are fully completed, then releasing the locking of the mutex.

Once the current process owning the mutex crashes during access to the shared memory, e.g. a process crash occurs during updating the header section of the shared memory in step (4), so it is very likely to break an update. Therefore, the control data in the header section of the shared memory will not be consistent with the data status in the data section any more and the control data corruption will occur in the header section of the shared memory. As described previously, such data corruption will cause the shared memory not to function normally any more and even lose data completely.

Moreover, in the environment of an operating system such as Windows, if a process crashes for some reason when a mutex is being locked by the process, the process has not released its ownership of the mutex it owns. At this point, the mutex is considered to be abandoned, which subsequently causes any other process to get WAIT_ABANDONED returning code when trying to obtain the mutex by the Windows operating system calling "WaitForSingleObject( )." This means that although the mutex is in an idle status, it cannot be owned by other processes for use of exclusive access to the shared memory. Hence, other processes are unable to access the shared memory, failing to obtain the available mutex.

Therefore, there is a need for a technical solution capable of solving shared memory data corruption in the prior art. Moreover, there is a need for a technical solution that ensures, in the environment of an operating system such as Windows, a process to get another available mutex when a mutex is in an abandoned status.

SUMMARY

A method and apparatus for decreasing shared memory data corruption is disclosed. Some embodiments provide a method of controlling access to a shared memory, which can automatically switch to another available mutex upon detection that a current mutex is abandoned.

There is provided a method for decreasing shared memory data, corruption. Said shared memory includes a header section and a data section, wherein said header section includes at least two headers in which control information is stored. The method comprises the steps of: judging whether or not there is data corruption in one of said at least two headers; and copying the control information in any one of other headers to said one header if there is data corruption in said one header.

The header section of the shared memory includes at least two headers in which control information is stored. Thus, if a process crashes all of a sudden during updating one of said at least two headers, which causes data corruption in the header section, then a process accessing the shared memory subsequently can detect the corruption and automatically recover the header section to be consistent by copying another header section to the header section.

There is provided an apparatus for decreasing shared memory data corruption. Said shared memory includes a header section and a data section, wherein said header section includes at least two headers in which control information is stored. The apparatus comprises: judging means for judging whether or not there is data corruption in one of said at least, two headers; and first copying means for copying the control information in any one of other headers to said one header if there is data corruption in said one header.

There is provided a method of controlling access to a shared memory, wherein an array of mutexes consisting of plural mutexes is created. The method comprises the steps of: determining whether or not a current mutex is abandoned when an application attempts to access said shared memory; and selecting to lock the next available mutex in said array of mutexes for exclusive access to said shared memory, if it is determined that said current mutex is abandoned.

In some embodiments, an array of mutexes consisting of plural mutexes is created in advance when the shared memory is being initialized. This is in contrast to only one mutex for a shared memory as in the prior art. Once a mutex in the array is abandoned due to an application crash, a process accessing the shared memory subsequently can handle this exception and automatically switch to another available, mutex, so that the procedure is continued without any interruption or impact. The size of the array of mutexes can be customized, e.g. 8, 16, and 32.

Embodiments provide a mechanism for minimizing the possibility of shared memory data corruption, which can completely prevent data corruption in the shared memory without any perceptible impact on system performance. Moreover, the present invention can be easily applied to existing technical solutions using a shared memory to enhance the reliability of related products.

BRIEF DESCRIPTION OF THE DRAWINGS

The features, advantages and other aspects of the present invention will become more apparent from the following detailed description, when taken in conjunction with the accompanying drawings, in which.

DESCRIPTION OF EMBODIMENTS

The following is a detailed description of example embodiments depicted in the accompanying drawings. The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Figure 1:
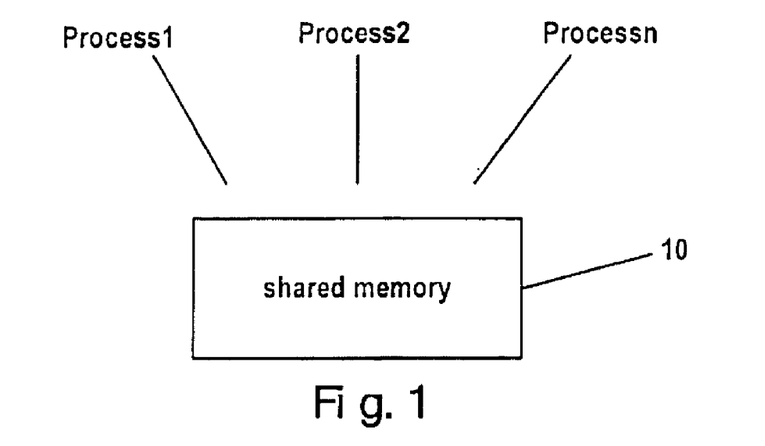
FIG. 1 depicts an exemplary shared memory application environment in which embodiments of the invention can be implemented.

FIG. 1 is a schematic view of a shared memory application environment in which the present invention can be applied. As the fastest Inter-Process Communication (IPC) mechanism, a shared memory supports high-speed data transfer. Usually, a plurality of processes can simultaneously require access to a shared memory. As shown in FIG. 1, a plurality of processes, such as process 1, process 2, . . . , process n can require access to a shared memory 10 in a multi-task environment.

When the plurality of processes, such as process 1, process 2, . . . , process n require access to the shared memory 10, there is a need for an inter-process synchronization mechanism in order to prevent a plurality of processes, such as process 1, process 2, . . . process n from accessing the shared memory 10 at the same time. These inter-process synchronization mechanisms include, for example, critical section, mutex, semaphores, events, interlocked function, message queues, etc. The description of embodiments of the present invention will be given by taking a mutex as an example of an inter-process synchronization mechanism. However, those skilled in the art should appreciate that other inter-process synchronization mechanisms can also be employed by the present invention.

In one embodiment, a mutex is used to ensure exclusive access of a process to a shared memory. Specifically, when a process owns a mutex, it enjoys exclusive access to: a shared memory, and other processes should keep waiting until this process completes exclusive-access to the shared memory and releases the mutex. Then the other processes can perform exclusive access to the shared memory with the mutex. In this manner, it is ensured that only one process exclusively accesses the shared memory at a time.

Moreover, as the description will be given in terms of a process's access to a shared memory, those skilled in the art will appreciate that embodiments may also be employed in the situation where a plurality of threads or applications require access to a shared memory. Therefore, "process," "thread," and "application" will be used without being differentiated from one another in the description given below.

In one embodiment, there is provided a mechanism for decreasing shared memory data corruption. The basic principle is to make the header section of a shared memory have at least two headers in which the same control information is stored, during the initialization of the shared memory. In this manner, when data in any one of the at least two headers is corrupt, the control information in other header(s) without data corruption can be utilized to recover the control information in the header with data corruption.

Specifically, there is provided a method for decreasing the shared memory data corruption. Said shared memory comprises a header section and a data section, and said header section includes at least two headers in which control information is stored. The method comprises the steps of: judging whether there is data corruption in one of said at least two headers; and if there is a data corruption in said one header, copying the control information in any one of other headers to said one header. Preferably, the method further comprises the step of copying the control information in said one header to other headers if there is no data corruption in said one header.

Preferably, the method further comprises the step of accessing the data section of said shared memory based on the control information in any one of said at least two headers. More preferably, the method further comprises the steps of: updating the control information in any one of said at least two headers, after accessing the data section of said shared memory; and copying said updated control information to all headers except for said updated header.

Figure 2:
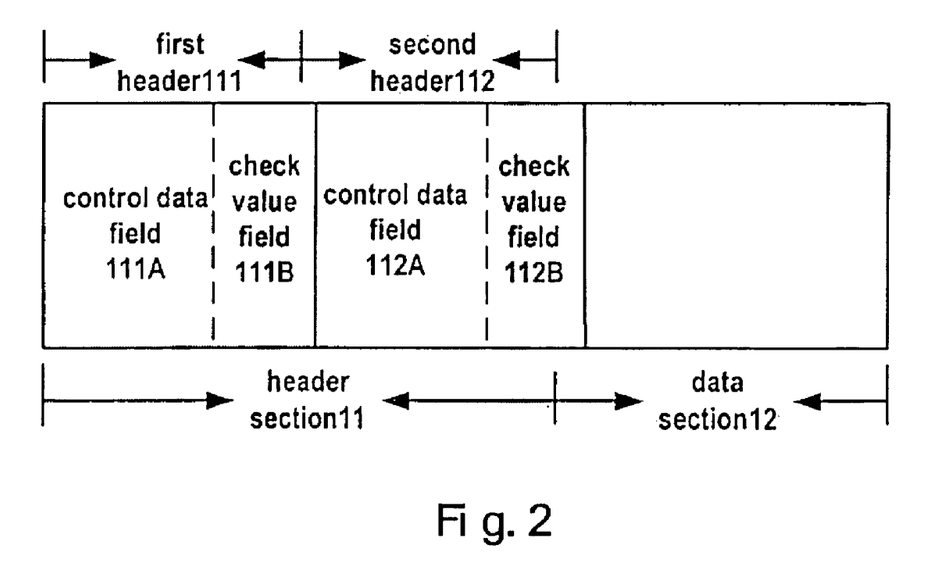
FIG. 2 depicts a data structure of a shared memory according to one embodiment of the present invention.
Figure 3:
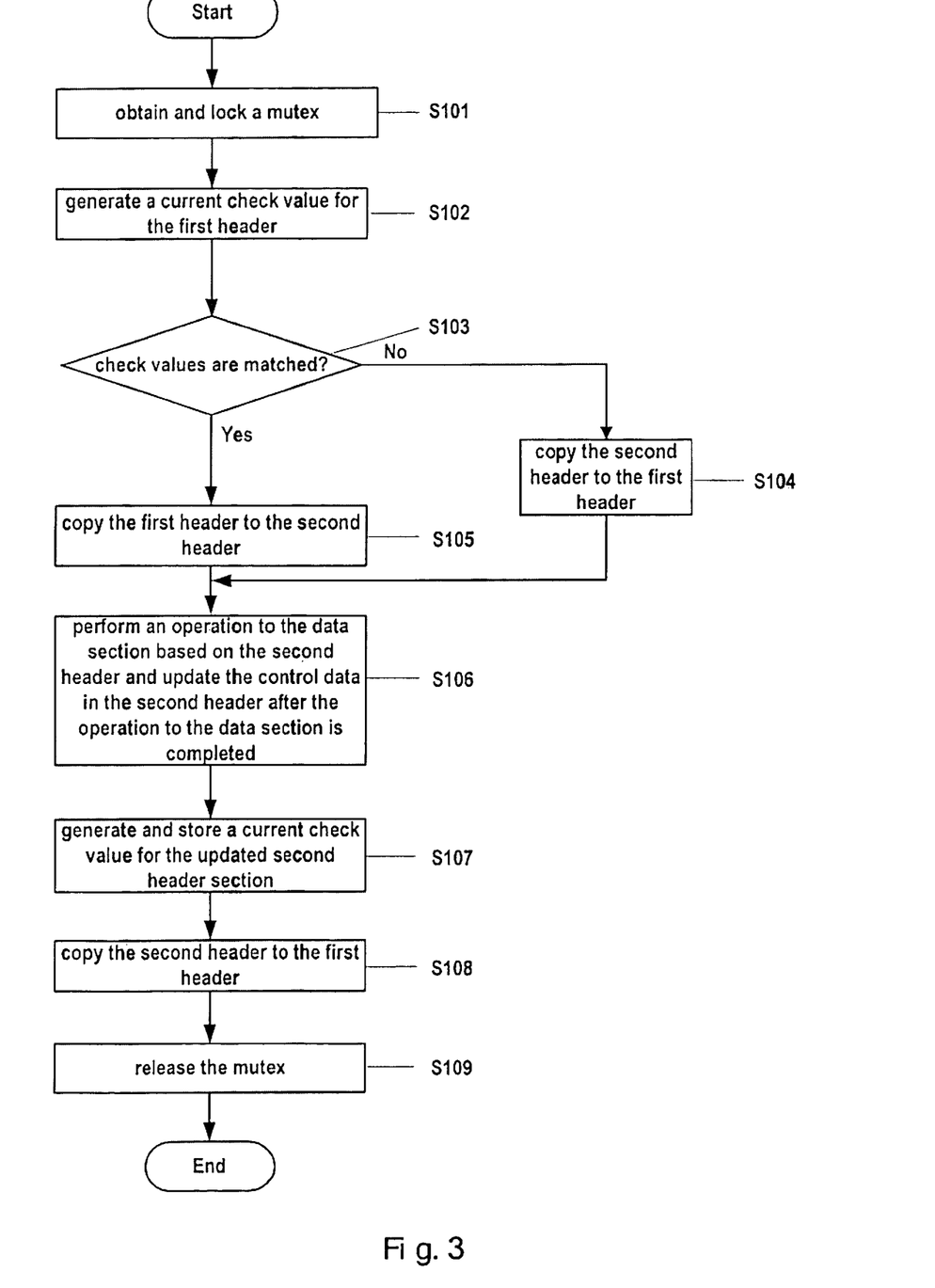
FIG. 3 schematically depicts a flowchart of a method for decreasing the shared memory data corruption according to one embodiment of the present invention.

Referring to FIGS. 2 and 3, a first embodiment of the present, invention will be described in detail below. FIG. 2 depicts a schematic view of the data structure of a shared memory layout in this embodiment. As depicted in FIG. 2, the shared memory 10 comprises a header section 11 and a data section 12. In the header section 11, there is stored critical control data such as semaphores, size of memory block, pointers to available locations etc. In the data section 12, there is stored data associated with applications. Usually, after a process gets a mutex, it performs reading or writing operation to the data section 12 based on the control data in the header section 11, and updates the control data in the header section 11 after the reading or writing operation to the data section 12, so that the control data in the header section 11 can correctly reflect a data status in the data section 12.

The header section 11 of the shared memory 10 further comprises a first header 111 and a second header 112. After initialization, the first header 111 and the second header 112 store the same control information. Specifically, the first header 111 includes a control data field 111A and a check value field 111B for storing the control data and the check values of the control data respectively. Likewise, the second header 112 includes a control data field 112A and a check value field 112B for storing the control data and the check values of the control data respectively. Preferably, the check values stored in the check value field 111B and the check value field 112B may be a checksum of the control data stored in the control data field 111A and the control data field 112A, respectively.

Those skilled in the art should appreciate that the control information in the first header 111 is completely the same as that in the second header 112 after the shared memory is newly created and initialized old under normal conditions. Those skilled in the art should also appreciate that the shared memory layout depicted in FIG. 2 is exemplary and shared memory layouts are not limited to the layout depicted in FIG. 2 so long as the shared memory includes, at least two headers.

Usually, after the shared memory 10 is created and initialized, a check value is immediately generated for the control data stored in the control field 111A of the first header 111, and the control information in the first header 111 is then copied to the second header 112, i.e. contents in the control data field 111A and the check value field 111B are copied to the control data field 112A and the check value field 112B correspondingly, so that contents in the first header 111 are completely identical to those in the second header 112.

Referring to FIG. 3, a method for decreasing, shared memory data corruptions will be described in detail. First, after the method starts processing, in step S101, a process gets and locks a mutex, thereby starting exclusive access to the shared memory 10 in step S102, a current check value is generated for the control data stored in the control data field 111A of the first header 111, wherein the generated current check value is used to be compared with a previous check value that was stored in the check value field 111B. Preferably, the current check value is a checksum of the control data in the control data field 111A of the first header 111.

As is appreciated by those skilled in the art, a check value verifying method means reading data from a data memory, generating a current check value by a check "Value" algorithm, and comparing the generated current check value with a previous check value. If the comparison results in that the current check value is equal to the previous check value, it indicates that data in the memory was not damaged. Otherwise, if the comparison results in that the current check value is not equal to the previous check value, it indicates that data in the memory was damaged. The present invention can adopt any proper algorithm, such as parity check, to verify a check value. Since the calculation and comparison of a check value is well known to those skilled in the art, details thereof are omitted here.

In step S103, the current check value generated in step S102 is compared with a previous check value stored in the check value field 111B so as to determine whether or not these two check values are matched. If it is determined in step S103 that the two check values are not matched, it indicates that there is data corruption in the control data field 111A of the first header 111. In this case, the processing proceeds to step S104. As described previously; in a shared memory, "data corruption" means the control data in the header section are damaged or lost or inconsistent with an operating data status of the data section. That is, the control data in the header section cannot correctly reflect the data status in the data section. Usually, when a process is updating the control data in the control data field of the first header 111, the control data in the control data field will be corrupt if the process crashes all of a sudden. Hence, the check values will be probably unmatched when a subsequent process performs access to the shared memory.

If it is determined in step S103 that the two check values are matched, it indicates that data in the control data field 111A of the first header 111 is not corrupt. In this cases the processing proceeds to step S105. In step S104, the control information (including the control data and check values) in the second header 112 is correspondingly copied to the first header 111 in order to recover the control information in the first header 111. Afterwards, the processing proceeds to step S106. In step S105, the control information in the first header 111 is correspondingly copied to the second header 112 in order to make the control information in the first header 111 completely identical to that in the second header 112. Then, the processing, proceeds to step S106. Data corruption in the second header 112 is prevented by performing step S105. In step S106, reading and writing is performed to the data section 12 of the shared memory 10 based on the control data in the second header 112, and the control data in the control data field 112A of the second header 112 is updated after the reading and writing. Since this step is identical to the processing in the prior art, detailed illustration thereof is omitted.

Next, the processing proceeds to step S107. In step S107, a current check value is generated for the control data in the control data field 112A of the second header 112 and is stored in the check value field 112B to replace a previous check value stored previously in the check value field 112B. A method for generating a check value in step S107 is the same as the method for generating a check value in step S102. After that, the processing proceeds to step S108. In step S108, the control information in the second header 112 is correspondingly copied to the first header 111 so that the control information in the first header 111 is completely identical to that in the second header 112. Finally, in step S109, the locking of the mutex by the process is released so that the process achieves access to the shared memory. After the process releases the locking of the mutex, a subsequent: process can get the locking of the mutex and access the shared memory by performing the same steps as steps S101 through S109. Those skilled in the art should appreciate that as a substitute for the flow depicted in FIG. 3, the flow depicted below is also applicable in some embodiments.

In step S102, a check value is generated for the second header instead of the first header. In step S103, whether or not check values are matched is determined. If the determination result is "No" in step S103, then the control information in the first header 111 is copied to the second header 112 in step S104, and the processing proceeds to step S106 afterwards. If the determination result is "Yes" in step S103, then the processing proceeds to step S105. In step S105, the control information in the second header 112 is copied to the first header 111 so that the control information in the first header 111 is completely identical to that in the second header 112.

Likewise, in step S106, an operation is performed to the data section based on the control data in the first header 111, and the control data in the first header 111 is updated after the operation of the data section. Subsequently, a check value is generated for the updated control data in the first header 111 in step S107. And in step S108, the control information in the first header 111 is copied to the second header 112 so that the control information in the first header 111 is completely identical to that in the second header 112.

It can be seen that in the present invention, the matching step of step S103 and the updating step of step S106 can be performed based on either of the first header 111 and the second header 112. Compared with the prior art, the header section of the shared memory, according to this embodiment includes a first header and a second header. Moreover, each of the first header and the second header includes a check value field. Thus, if a process suddenly crashes when updating one of the first header and the second header and causes data corruption in the header section, then a process accessing the shared memory subsequently can detect the corruption by check value matching and recover the header automatically by copying the control information in the other header of the first header and the second header to the header having data corruption. In this manner, the method can ensure there is always at least one consistent header section. Therefore, previous data will at least not be lost due to a certain process crashes.

Moreover, the method is not limited to any specific environment but can be applied in any operating system environment. As the situation in which the header section includes a first header and a second header has been illustrated in detail, the present invention is not limited to this, and a solution that the header section includes three or more headers, also falls into the scope of the present invention. The operation and processing for the solution that the header section includes three or more headers is similar to that for the embodiment including two identical headers.

Figure 4:
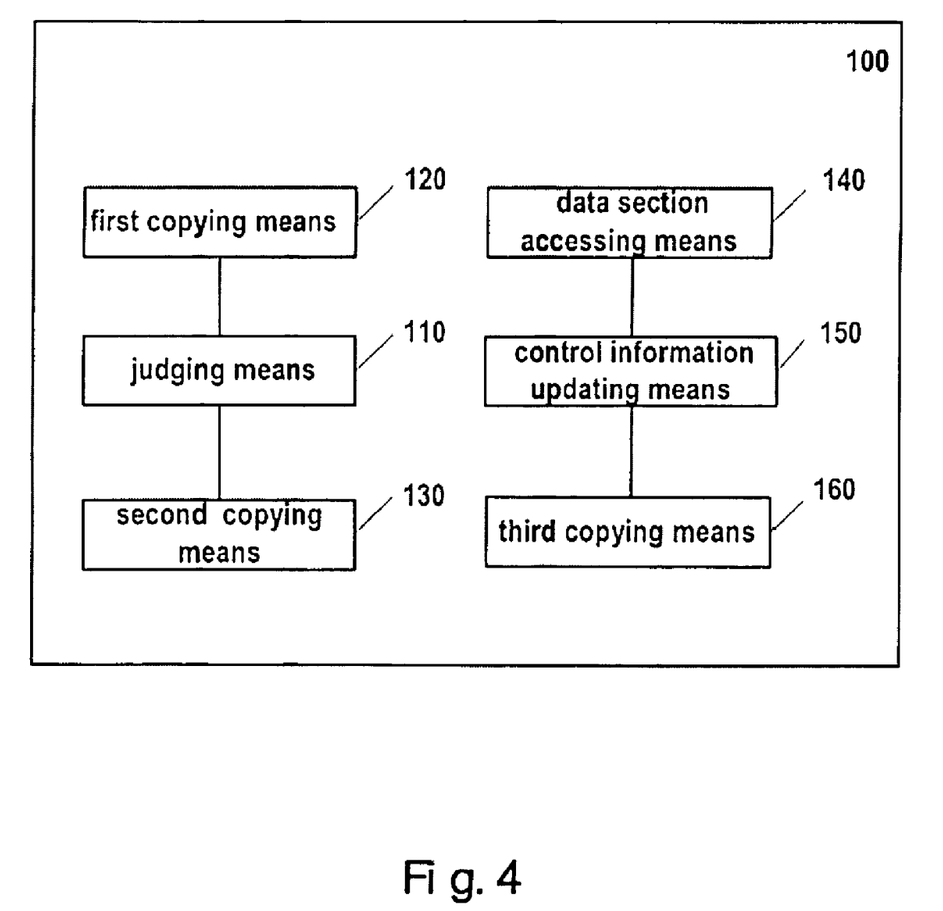
FIG. 4 schematically depicts a block diagram of an apparatus for decreasing the shared memory data corruption according to one embodiment of the present invention.

Moreover, as depicted in FIG. 4, there is provided an apparatus 100 for decreasing shared memory data corruption. The shared memory includes a header section and a data section, and said header section includes at least two headers in which control information is stored. The apparatus 100 comprises: judging means 110 for judging whether or not data corruption occurs in one of said at least two headers; and first copying means 120 for copying the control information in any one of other headers to said one header if data corruption occurs in said one header. Preferably, the apparatus 100 further comprises second copying means 130 for copying the control information in said one header to other header(s) if no data corruption occurs in said one header.

Preferably, the apparatus 100 further comprises data section accessing means 140 for accessing the data section of said shared memory based on the control data in any one of said at least two headers. More preferably, the apparatus 100 further comprises: control information updating means 150 for updating the control information in any one of said at least two headers after said data section accessing means 140 performs access to the data section of said shared memory; and third copying means 160 for copying said updated control information to all headers except for said updated header. Details of the operation for each means of the apparatus 100 correspond to the steps of the method described herein.

Usually, only one mutex is created for a shared memory when the shared memory is initialized. However, in some operating system environments such as Windows, if a process currently accessing a shared memory crashes suddenly for some reason, then the mutex becomes abandoned while data corruption is possibly caused in the shared memory. That is to say, the mutex is unavailable for a subsequent process though it is in an idle status. The next embodiment of the present invention is intended to overcome this deficiency.

A principle of the next embodiment is to create an array of mutexes consisting of plural mutexes in advance when creating a shared memory. Once the mutex that is used currently is abandoned due to a process crash, another process subsequently accessing the mutex can automatically switch to the next lockable mutex in the array of mutexes. In this embodiment, the size of the array of mutexes can be customized, e.g. 8, 16, 32, etc. In practice, an array of mutexes comprising 8 mutexes is enough for most cases.

Figure 5:
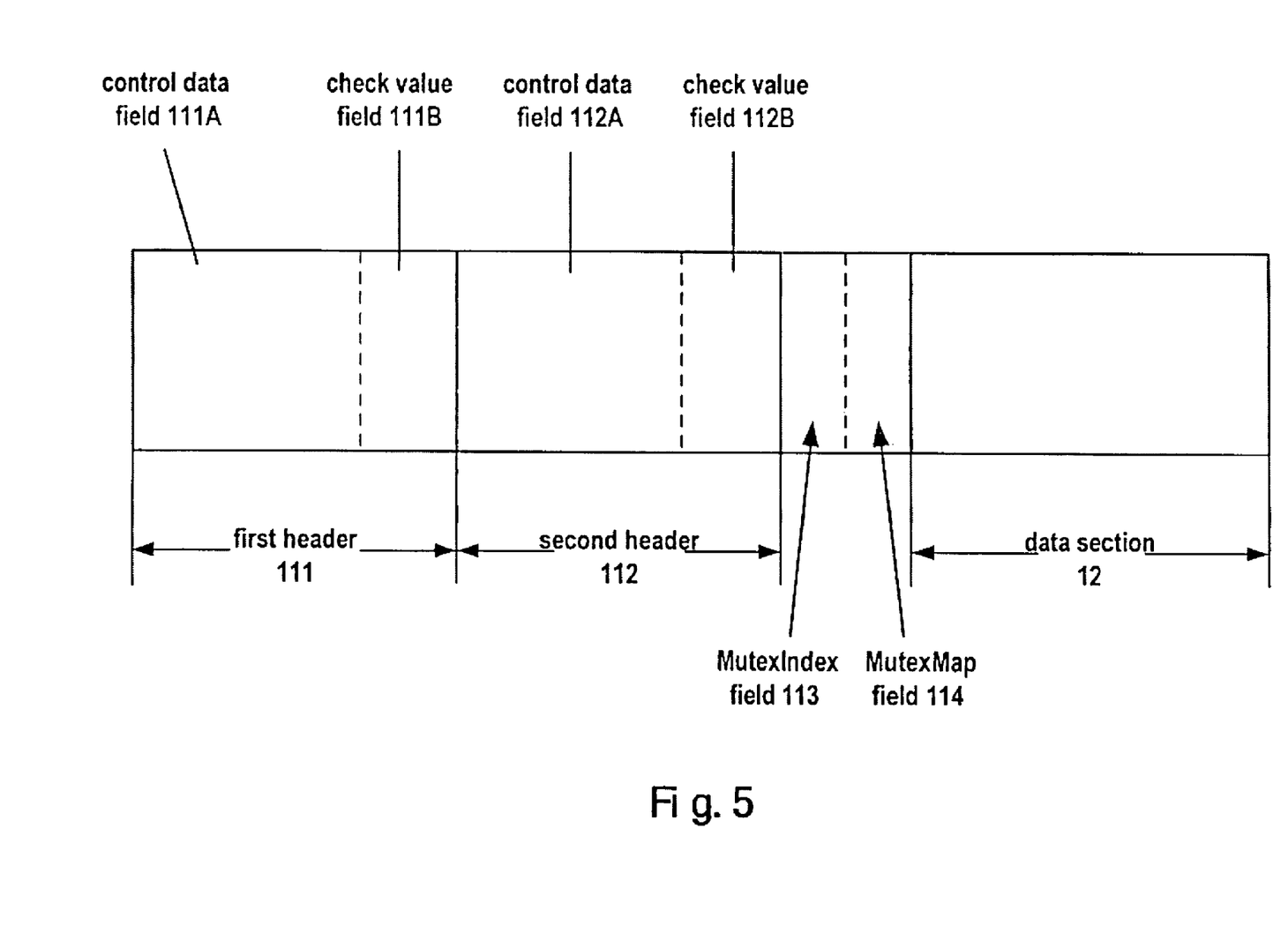
FIG. 5 depicts a data structure of a shared memory according to a second embodiment of the present invention.
Figure 6:
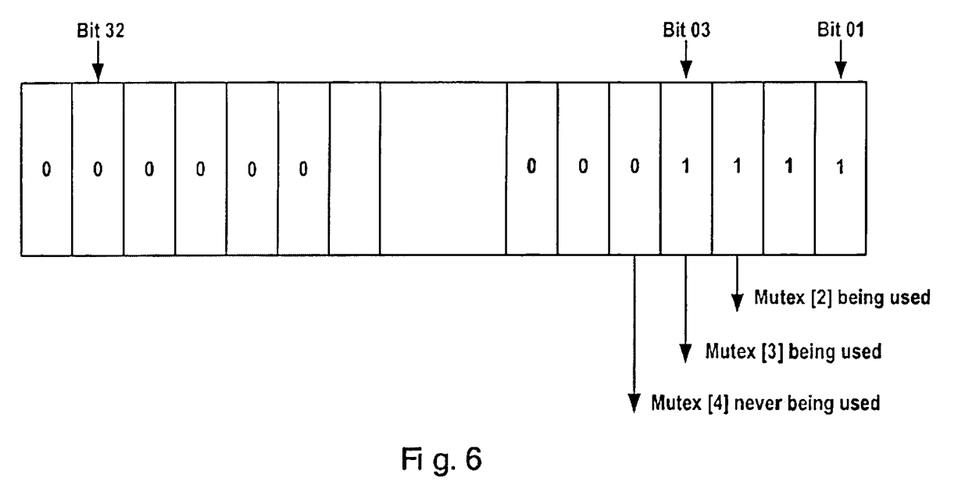
FIG. 6 depicts an example of the "MutexMap" field in a shared memory according to the second embodiment of the present invention.
Figure 7:
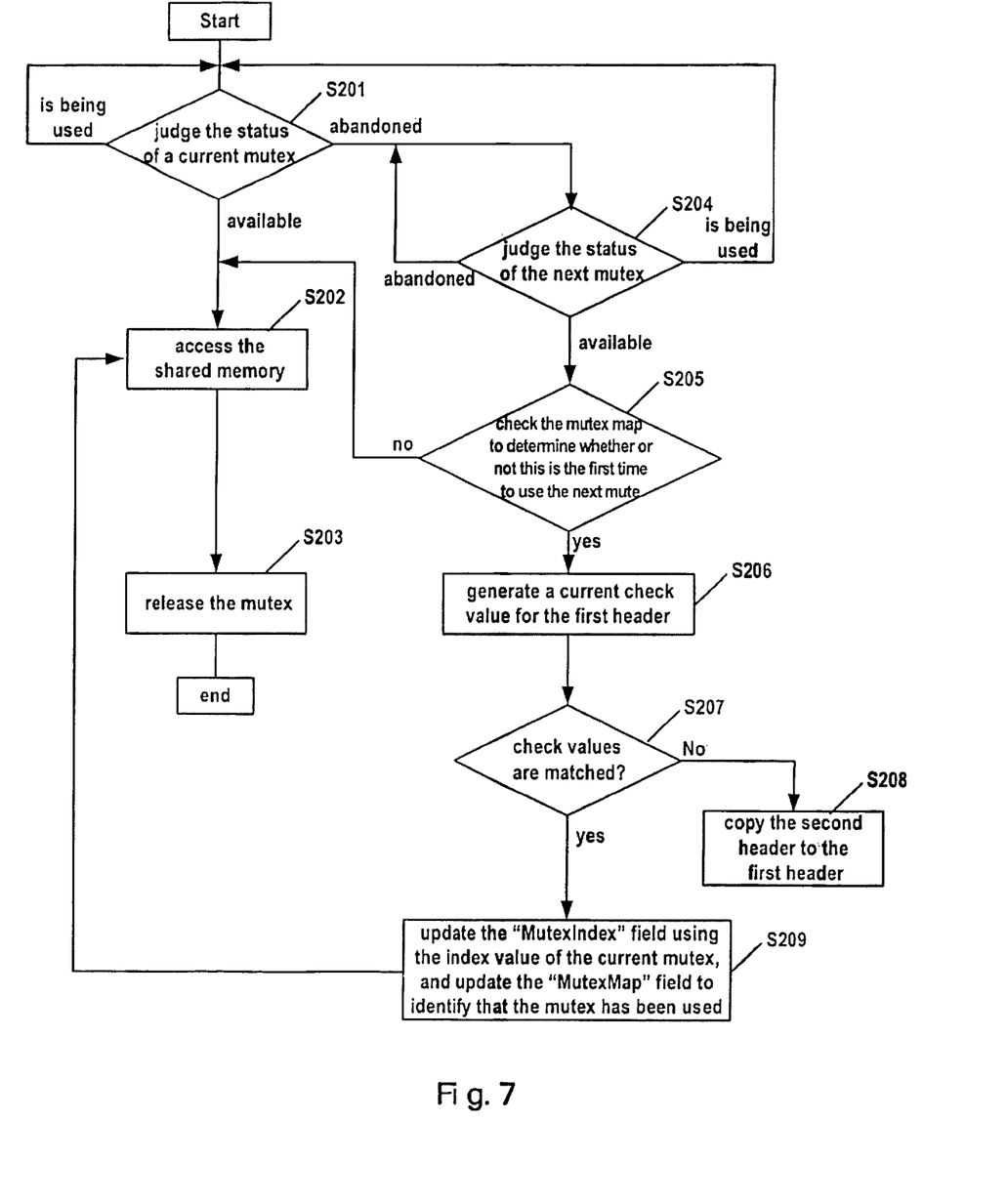
FIG. 7 schematically depicts a flowchart of a method for controlling access to a shared memory according to the second embodiment of the present invention.

Hereafter, this second embodiment of the present invention will be illustrated in detail in conjunction with FIGS. 5-7. FIG. 5 depicts a data structure of a shared memory according to the second embodiment. A shared memory 10' according to the second embodiment differs from the shared memory layout 10 according to the first embodiment in the addition of two new fields, namely a MutexIndex field 113 and a MutexMap field 114. The two added fields can be located inside or outside the header of the shared memory. In the layout depicted in FIG. 5, the two fields are located outside the header of the shared memory.

In the second embodiment, the MutexIndex field 113 is used for storing the index of a mutex owned by the processes accessing the shared memory currently. The MutexIndex field 113 is a data type on which reading/writing operation is unbreakable on both 32-bit and 64-bit platforms, e.g. signed/unsigned short, and signed/unsigned int. In the second embodiment, the MutexMap field 114 is used for tagging whether or not each mutex in the array of mutexes is used for the first time. FIG. 6 depicts an example of the MutexMap field 114, wherein "1" indicates that a corresponding mutex has been used, and "0" indicates that a corresponding mutex has not been used. Right after the shared memory has been created/initialized, both "MutexIndex" field and "MutexMap" field are set to be zero, which means that Mutex[0] will be utilized at the beginning, and no mutex has been accessed so far. In the second embodiment, it is important to create all mutexes in the array of mutexes in advance and ensure that no conflict will happen when a mutex is required simultaneously by two or more processes during runtime. Those skilled in the art should appreciate that the examples of FIGS. 5 and 6 are merely exemplary and not restrictive.

Referring to FIG. 7, description will be given the method for controlling access to a shared memory according to the second embodiment. First, the status of a current mutex is judged in step S201. If it is determined in step S201 that the current mutex is being used, then the processing returns to step S201 until the current mutex is released and becomes available. If the judgment in step S201 results in that the mutex is available, then exclusive access to the shared memory is performed using the mutex in step S202. In step S203, after the exclusive access to the shared memory is completed, the mutex is released so as to be used by the subsequent process. If the judgment in step S201 results in that the mutex is abandoned, then the processing proceeds to step S204. In step S204, the status of the next mutex in the array is judged. Specifically, 1 is added to the current index value to obtain a new index value first. Then, it is judged whether or not the obtained new index value is larger than the size of the memory array.

If the new index value is larger than the size of the array of mutexes, it means that there is no available mutex. In this case, the processing ends with the fact that the current mutex is abandoned. In fact, as mentioned above, if the size of the array of mutexes is set to be large enough (for example, there are 8 mutexes in the array), then the situation in which the processing ends with the abandonment of the current mutex will not arise generally. Moreover, if the obtained new index value is smaller than the size of the array of mutexes, then the status of the next mutex corresponding to the new index value is judged.

If it is determined in step S204 that the next mutex is abandoned, then step S204 is repeated to check the status of the next mutex. If it is determined in step S204 that the next mutex is being used, then the processing returns to step S201. If it is determined in step S204 that the next mutex is available, then the processing proceeds to step S205. In step S205, it is judged whether or not this is the first time to use the next mutex. Preferably, the determination as to whether or not this is the first time to use the next mutex is made by checking a value corresponding to the next mutex in the "MutexMap" field. For example, if the value is "0," it means this is the first time to use the next mutex; and if the value is "1," it means that the next mutext has been used already.

If it is determined in step S205 that this is the first time to use the next mutex, then the processing proceeds to step S206. Here, it should be noted that since this is the first time to use the next mutex, there is a possibility that the last process crashes during accessing to the shared memory and data corruption happens in the header of the shared memory. In this case, the processing of step S206 through step S209 needs to be performed, i.e. the processing as described in the first embodiment described above needs to be performed. In step S206, a current check value is generated for the first header 111 in order to be compared with a previous check value stored in the check value field 111B of the first header 111.

In step S207, the current check value generated in step S206 is compared with the previously stored check value. If the comparison results in that they are not equal to each other, then the processing proceeds to step S208. If the comparison results in that they are equal to each other, then the processing proceeds to step S209. In step S208, the control information in the second header 112 is copied to the first header 111 to recover the control information in the first header 111. Then, the processing proceeds to step S209. In step S209; the value in the "MutexIndex" field is updated using the current mutex index value, and the "MutexMap" field is also updated to identify that the mutex corresponding to the mutex index value has been used. Next, the processing proceeds to step S202 in which normal access to the shared memory is performed. The mutex is released in step S203, and finally the processing ends.

In addition, in step S205, if the next mutex is determined as having been used previously in step S205, it is shown that there is no data corruption in the last process, and there is no data corruption in the first header of the shared memory 10. In this case, there is no need for the steps S206 to S209. The processing directly proceeds to step S202 to perform the normal access to the shared memory. The mutex is released in step S203, and finally the processing ends. Compared with the first embodiment described above, the second embodiment is provided with an array of mutexes consisting of plural mutexes, and the MutexIndex field and the MutexMap field are added to the shared memory. Therefore, in the second embodiment, even though some mutexes may get to be abandoned during the whole life cycle of the shared memory, there is always another standby mutex, unless the whole mutex array is exhausted. In practice, if the size of the mutex array is defined as ">=8," then, 100% availability can be achieved.

As the first and second embodiments have been illustrated in detail with reference to the accompanying drawings, it is to be understood that the features and steps in the first and second embodiments can be combined in any way in practice. The present invention can be implemented in various programming languages including, but not limited to, C, C++, Dephi, Visual Basic, etc. The present invention can be implemented by hardware, software, firmware or a combination thereof. Those skilled in the art should appreciate that the present invention can be embodied in a computer program product disposed on a signal carrier medium suitable to be used in any proper data processing system. Such a signal carrier medium may be a transmission medium or a recordable medium for use in machine-readable information, including a magnetic medium, an optical medium or other proper medium. Examples of a recordable: medium include a magnetic disk or floppy disk in a hard-disk driver, an optical disk for a CD driver, a magnetic tape, and other medium those skilled in the art can devise. Those skilled in the art should appreciate that any communication terminal having a proper programming apparatus can embody the steps of the method of the present invention which are embodied in a program product, for example.

It is to be understood from the above description that alternations and modifications of the present invention may be constructed without departing from the true spirit of the present invention. The description in this specification is by way of example only and not intended to be limiting. Accordingly, the present invention is limited only as defined in the following claims.

What is claimed is:

1. A method for decreasing shared memory data corruption, said shared memory including a header section and a data section, wherein said header section includes at least two headers in which control information is stored, the method comprising:
   determining whether there is data corruption in a first of said at least two headers; and
   copying the control information in any one of other headers to said first header if there is data corruption in said first header.

2. The method according to claim 1, further comprising:
   copying the control information in said first header to other header(s) if there is no data corruption in said first header.

3. The method according to claim 1, further comprising:
   accessing the data section of said shared memory based on the control information in any one of said at least two headers.

4. The method according to claim 3, further comprising the steps of:
   updating the control information in any one of said at least two headers after accessing the data section of said shared memory; and copying said updated control information to the header(s) except for said updated header.

5. The method according to claim 1, wherein each of said at least two headers includes a control data field for storing control data and a check value field for storing check values of said control data.

6. The method according to claim 5, wherein determining whether or not there is data corruption in said first header is implemented by calculating a current check value for the control data in the control data field of said first header and comparing the current check value with a previous check value previously stored in said check value field.

7. The method according to claim 5, wherein said check values are a checksum of said control data.

8. The method according to claim 6, further comprising:
accessing the data section of said shared memory based on the control data in any one of said at least two headers;
updating said control data in any one of said at least two headers after accessing the data section of said shared memory;
generating a current check value for said updated control data and storing it in a corresponding check value field; and
copying the updated control data and the check value to other header(s) respectively.

9. The method according to claim 1, wherein exclusive access to said shared memory is implemented using a mutex.

10. The method according to claim 9, wherein an array of mutexes consisting of plural mutexes is created, the method further comprising:
determining whether or not a current mutex is abandoned before said step of determining whether there is data corruption in the first header is performed; and
selecting the next available mutex in said array of mutexes if it is determined that said current mutex is abandoned.

11. An apparatus for decreasing shared memory data corruption, said shared memory including a header section and a data section, wherein said header section includes at least two headers in which control information is stored, the apparatus comprising:
determining means for determining whether there is data corruption in a first of said at least two headers; and
first copying means for copying the control information in any one of other headers to said first header if there is data corruption in said first header.

12. The apparatus according to claim 11, further comprising:
second copying means for copying the control information in said first header to other header(s) if there is no data corruption in said first header.

13. The apparatus according to claim 12, further comprising:
data section accessing means for accessing the data section of said shared memory based on the control information in any one of said at least two headers.

14. The apparatus according to claim 13, further comprising:
control means updating means for updating the control information in any one of said at least two headers after said data section accessing means accesses the data section of said shared memory; and
third copying means for copying said updated control information to the header(s) except for said updated header.

15. The apparatus according to claim 11, wherein each of said at least two headers includes a control data field for storing control data and a check value field for storing check values of said control data.

16. The apparatus according to claim 15, wherein said determining means determines whether there is data corruption in said first header by calculating a current check value for the control data in the control data field of said first header and comparing the current check value with a previous check value previously stored in said check value field.

17. The apparatus according to claim 15, wherein said check values are a checksum of said control data.

18. A method of controlling access to a shared memory, wherein an array of mutexes consisting of plural mutexes is created, the method comprising:
determining whether or not a current mutex is abandoned when an application attempts to access said shared memory; and
selecting to lock the next available mutex in said array of mutexes for exclusive access to said shared memory, if it is determined that said current mutex is abandoned, wherein said shared memory includes a header section and a data section, said header section includes at least two headers in which control information is stored, and said shared memory further includes a MutexIndex field and a MutexMap field, wherein said MutexIndex field stores indexes to a currently locked mutex, and said MutexMap field indicates whether or not this is the first time to use each mutex in said array, the method comprising:
determining whether there is data corruption in a first of said at least two headers, when said MutexIndex field indicates that this is the first time to use the next locked available mutex; and
copying the control information in any one of other headers to said first header, if there is data corruption in said first header.

* * * * *